G. W. DOVER.
LATHE TOOL.
APPLICATION FILED JUNE 19, 1920.

1,366,367.

Patented Jan. 25, 1921.

INVENTOR:
George William Dover
By Chas. H. Luther
ATTORNEY.

UNITED STATES PATENT OFFICE.

GEORGE WILLIAM DOVER, OF CRANSTON, RHODE ISLAND.

LATHE-TOOL.

1,366,367.   Specification of Letters Patent.   Patented Jan. 25, 1921.

Application filed June 19, 1920. Serial No. 390,177.

*To all whom it may concern:*

Be it known that I, GEORGE WILLIAM DOVER, a citizen of the United States, residing at Cranston, in the county of Providence and State of Rhode Island, have invented a new and useful Improvement in Lathe-Tools, of which the following is a specification.

This invention has reference to an improvement in machine tools and more particularly to an improvement in lathe tools.

The object of my invention is to improve the construction of a lathe tool whereby the cutting member is in the form of a straight bar having a cutting point on each end, the cutting member is adjustable to any desired angle and is adjustably secured, in an off set position to the holder.

My invention consists in the peculiar and novel construction of a lathe tool comprising a holder having a raised off set portion, a straight cutting member having a cutting point on each end, means for adjustably securing the cutting member to the off set portion of the holder and details of construction, as will be more fully set forth hereinafter and claimed.

Figure 1:
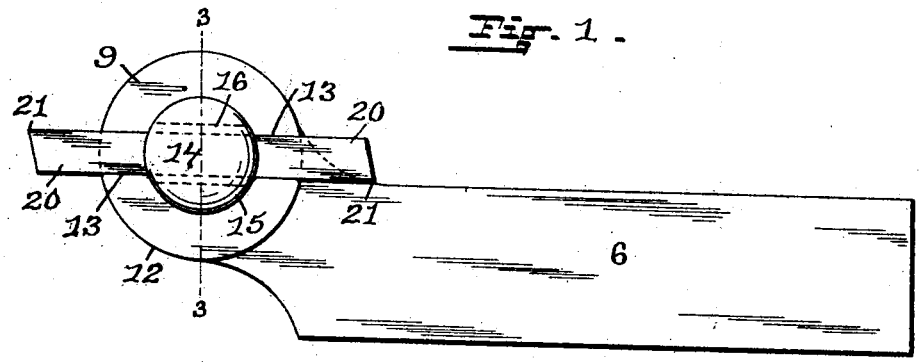
Figure 1 is a side view of my improved lathe tool showing the cutting member in an off set raised position from the holding member.
Figure 2:
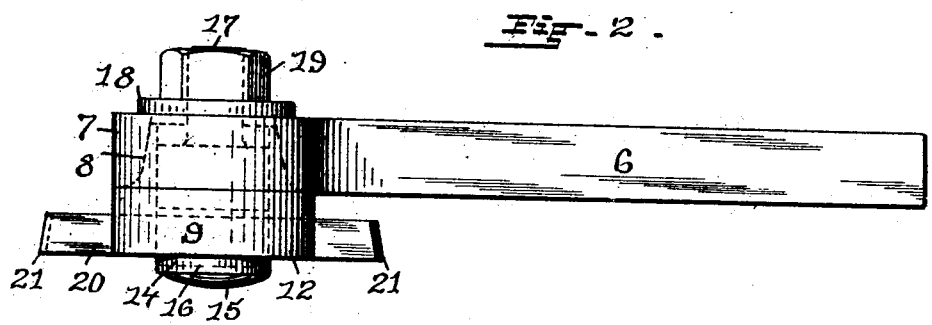
Fig. 2 is a top plan view of the lathe tool.
Figure 3:
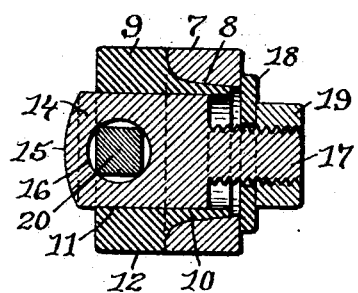
Fig. 3 is a transverse sectional view taken on line 3, 3 of Fig. 1 through the tool.
Figure 4:
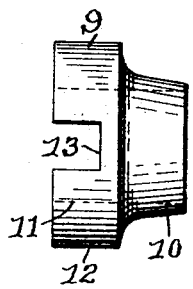
Fig. 4 is a side view of the cutting member adjusting member.
Figure 5:
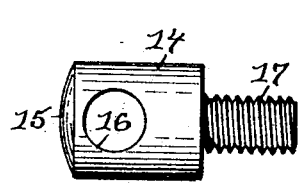
Fig. 5 is a side view of the cutting member fastening member.

In the drawings 6 indicates a holder in the form of a rectangular shaped bar having a raised off set end 7 in which is a round transverse tapered hole 8. A rotatable adjusting member 9 has a round tapered hub 10 which fits in the tapered hole 8, a central bolt hole 11 which extends through the hub 10 and a round head 12 in the face of which is a central transverse slot 13. A cutting member fastening member 14 in the form of a bolt has a round head 15 which fits in the bolt hole 11, a central transverse round hole 16 and a screw-threaded stem 17. A washer 18 bears against the rear side of the raised off set end 7 and a nut 19, in screw-thread engagement with the screw-threaded stem 17 bears against the washer 18, as shown in Fig. 3. A square bar shaped cutting member 20 has a cutting point 21 on each end, as shown in Figs. 1 and 2. This cutting member 20 fits in the slot 13 in the head of the adjusting member 9 and has a sliding fit in the round hole 16 in the head of the cutting member fastening member 14.

When in use the cutting member 20 may be adjusted to any desired angle and after adjustment the cutting member 20 is rigidly secured by tightening the nut 19. This forces the tapered hub 10 tightly into the tapered hole 8 and draws the cutting member 20 firmly into the slot 13, thereby rigidly securing the cutting member in the position required. The cutting member may be placed at any angle required for lathe or planer work and the tool may be used as either a right or left hand tool.

It is evident that the cutting points of the cutting member could be of any shape desired and other details of construction could be varied within the scope of the appended claim.

Having thus described my invention I claim as new.

A lathe tool comprising a holding member having a raised off set end in which is a round tapered hole, a rotatable adjusting member having a round tapered hub in the round tapered hole, a round head in which is a central transverse slot and a central bolt hole extending through the hub, a fastening member having a round head which fits in the bolt hole, a round central transverse hole and a screw-threaded stem, a washer against the rear side of the holder, a nut on the screw-threaded stem and against the washer, a square bar shaped cutting member having a cutting point on each end and extending through the slot in the adjusting member and the round transverse hole in the fastening member whereby on tightening the nut the cutting member is rigidly secured, at any angle desired, to the holding member.

In testimony whereof, I have signed my name to this specification.

GEORGE WILLIAM DOVER.